(12) United States Patent
Mazniker et al.

(10) Patent No.: US 9,432,418 B1
(45) Date of Patent: Aug. 30, 2016

(54) PRESENTING AN EVENT-RELATED POST IN A STREAM

(71) Applicant: Google Inc., Mountain View, CA (US)

(72) Inventors: Boris Mazniker, San Francisco, CA (US); Dobromir Montauk, Redwood City, CA (US); Mehran Bozorgi, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 14/013,671

(22) Filed: Aug. 29, 2013

Related U.S. Application Data

(60) Provisional application No. 61/707,841, filed on Sep. 28, 2012.

(51) Int. Cl.
*H04L 29/06* (2006.01)
*G06Q 50/00* (2012.01)
*H04L 12/58* (2006.01)
*G06Q 10/10* (2012.01)

(52) U.S. Cl.
CPC ............ *H04L 65/403* (2013.01); *G06Q 10/10* (2013.01); *G06Q 50/01* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 7,945,628 B1* | 5/2011 | Lunceford | G06F 15/16 709/206 |
| 9,053,189 B2* | 6/2015 | Hoag | G06F 17/30867 |
| 2001/0049637 A1* | 12/2001 | Tso | G06Q 30/02 705/26.8 |
| 2006/0240856 A1* | 10/2006 | Counts | H04W 4/08 455/518 |
| 2007/0218900 A1* | 9/2007 | Abhyanker | 455/435.1 |
| 2008/0040475 A1* | 2/2008 | Bosworth et al. | 709/224 |
| 2009/0018903 A1* | 1/2009 | Iyer | G06Q 10/10 705/14.14 |
| 2011/0015961 A1* | 1/2011 | Chan | G06Q 10/109 705/7.19 |
| 2011/0276396 A1* | 11/2011 | Rathod | G06F 17/30867 705/14.49 |
| 2013/0066963 A1* | 3/2013 | Odio et al. | 709/204 |
| 2014/0006499 A1* | 1/2014 | Ren | H04L 65/4076 709/204 |
| 2015/0074559 A1* | 3/2015 | Garcia et al. | 715/753 |

* cited by examiner

*Primary Examiner* — Thomas Dailey
(74) *Attorney, Agent, or Firm* — McDermott Will & Emery LLP

(57) ABSTRACT

Systems and methods for presenting an event-related post in a stream are provided. In some aspects, a plurality of event-related posts are received. Each of the plurality of event-related posts is visible to a viewing user. That a subset of the plurality of event-related posts is of interest to the viewing user is determined based on a set of factors. The subset of the plurality of event-related posts are presented within a stream for the viewing user.

20 Claims, 5 Drawing Sheets

PRESENTING AN EVENT-RELATED POST IN A STREAM

CROSS REFERENCE TO RELATED APPLICATION

This application claims priority under 35 U.S. C. §119(e) and the benefit of U.S. Provisional Application No. 61/707,841, filed Sep. 28, 2012, and entitled, "PRESENTING AN EVENT IN A STREAM," the entire disclosure of which is incorporated herein by reference.

BACKGROUND

The subject technology generally relates to social networking services and, in particular, relates to presenting an event-related post in a stream.

Hosts of events (e.g., parties or group outings) commonly inform others about the events and invite guests to attend via a social networking service. However, viewing users of the social networking service may not learn about the events unless the viewing users are invited to the events or the viewing users search for the events.

SUMMARY

In some innovative aspects, the disclosed subject matter relates to a computer-implemented method. The method includes receiving a plurality of event-related posts. Each of the plurality of event-related posts is visible to a viewing user. The method includes determining that a subset of the plurality of event-related posts is of interest to the viewing user based on a set of factors. The method includes presenting the subset of the plurality of event-related posts within a stream for the viewing user.

These and other embodiments can include one or more of the following features. A host of an event corresponding to at least one of the event-related posts is not a first degree social contact of the viewing user, and the set of factors comprises an attendee indicating a plan to attend the event or an invitee of the event being a first degree or second degree contact of the viewing user. A host of an event corresponding to at least one of the event-related posts is two or more degrees of separation from the viewing user, and the set of factors comprises one or more factors related to participants of the event. The plurality of event-related posts are related to at least one event having a host who is a second degree contact of the viewing user. The stream includes one or more of: a text post, an image, a video, a geographic check-in, or an external link. The set of factors includes one or more of: the viewing user being invited to an event related to the event-related posts in the subset, the host of the event being a first degree contact of the user, the host of the event being a second degree contact of the user, an attendee indicating a plan to attend the event or an invitee of the event being a first degree or second degree contact of the viewing user, or the viewing user having a predicted affinity level for the host, the attendee, or the invitee exceeding an affinity threshold. The set of factors includes one or more of: an event related to the event-related posts in the subset having at least an invitee threshold number of invitees, the event having at least an attendee threshold number of attendees indicating plans to attend the event, the event having at least an endorsement threshold number of endorsements, the event having at least a comment threshold number of comments, or the event being within a threshold distance of a default geographic location of the user. Determining that the subset of the plurality of event-related posts is of interest to the viewing user based on the set of factors includes determining an interest level for the viewing user for each event-related post from the plurality of event-related posts, and defining the subset of the plurality of event-related posts to include an event threshold number of event-related posts from the plurality of event-related posts having an interest level for the viewing user exceeding a threshold interest level value. The event threshold number is determined based on a number of content items in a single loaded page of the stream. The event-related posts include titles of events, geographic locations of the events, times of the events, and links to indicate plans to attend the events.

In some innovative aspects, the disclosed subject matter relates to a computer-readable medium encoded with executable instructions. The instructions include code for determining that a subset of a plurality of event-related posts is of interest to a viewing user based on a set of factors. Each of the plurality of event-related posts is visible to the viewing user. The plurality of event-related posts are related to a plurality of events, where a host of an event corresponding to at least one of the event-related posts in the subset is two or more degrees of separation from the viewing user, and where the set of factors comprises one or more factors related to participants of the event. The instructions include code for presenting the subset of the plurality of event-related posts within a stream for the viewing user.

These and other embodiments can include one or more of the following features. The plurality of events include at least one event having a host who is a contact of the viewing user. The stream includes one or more of: a text post, an image, a video, a geographic check-in, or an external link. The set of factors includes one or more of: the viewing user being invited to an event in the plurality of events, the host of the event being a first degree contact of the user, the host of the event being a second degree contact of the user, an attendee indicating a plan to attend the event or an invitee of the event being a first degree or second degree contact of the viewing user, or the viewing user having a predicted affinity level for the host, the attendee, or the invitee exceeding an affinity threshold. The set of factors includes one or more of: an event in the plurality of events having at least an invitee threshold number of invitees, the event having at least an attendee threshold number of attendees indicating plans to attend the event, the event having at least an endorsement threshold number of endorsements, the event having at least a comment threshold number of comments, or the event being within a threshold distance of a default geographic location of the user. Determining that the subset of the plurality of event-related posts is of interest to the viewing user based on the set of factors includes determining an interest level for the viewing user for each event-related post from the plurality of event-related posts, and defining the subset of the plurality of event-related posts to include an event threshold number of events from the plurality of event-related posts having an interest level for the viewing user exceeding a threshold interest level value. The event threshold number is determined based on a number of content items in a single loaded page of the stream. The event-related posts include titles of events, geographic locations of the events, times of the events, and links to indicate plans to attend the events.

In some innovative aspects, the disclosed subject matter relates to a system. The system includes one or more processors and a memory. The memory includes instructions executable by the one or more processors. The instructions include code for receiving a plurality of event-related posts.

Each of the plurality of event-related posts is visible to a viewing user. The plurality of event-related posts are related to a plurality of events. The instructions include code for determining that a subset of the plurality of event-related posts is of interest to the viewing user based on a set of factors, where a host of an event corresponding to at least one of the event-related posts in the subset is two or more degrees of separation from the viewing user, and where the set of factors comprises one or more factors related to participants of the event. The instructions include code for receiving an input for presenting a stream for the viewing user. The instructions include code for presenting, in response to the input, the subset of the plurality of event-related posts within the stream for the viewing user.

These and other embodiments can include one or more of the following features. The plurality of events includes at least one event having a host who is a second degree contact of the viewing user. The stream includes one or more of: a text post, an image, a video, a geographic check-in, or an external link. The set of factors includes one or more of: the viewing user being invited to an event in the plurality of events, the host of the event being a first degree contact of the user, the host of the event being a second degree contact of the user, an attendee indicating a plan to attend the event or an invitee of the event being a first degree or second degree contact of the viewing user, or the viewing user having a predicted affinity level for the host, the attendee, or the invitee.

exceeding an affinity threshold. The set of factors includes one or more of: an event in the plurality of events having at least an invitee threshold number of invitees, the event having at least an attendee threshold number of attendees indicating plans to attend the event, the event having at least an endorsement threshold number of endorsements, the event having at least a comment threshold number of comments, or the event being within a threshold distance of a default geographic location of the user.

Advantageously, the subject technology allows for information about event(s), for example, event-related post(s), to be presented in a stream of a social networking service, such that a user viewing his/her stream can learn about events in which the user may be interested. As a result, user engagement or participation in events published via the social networking service may be increased.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
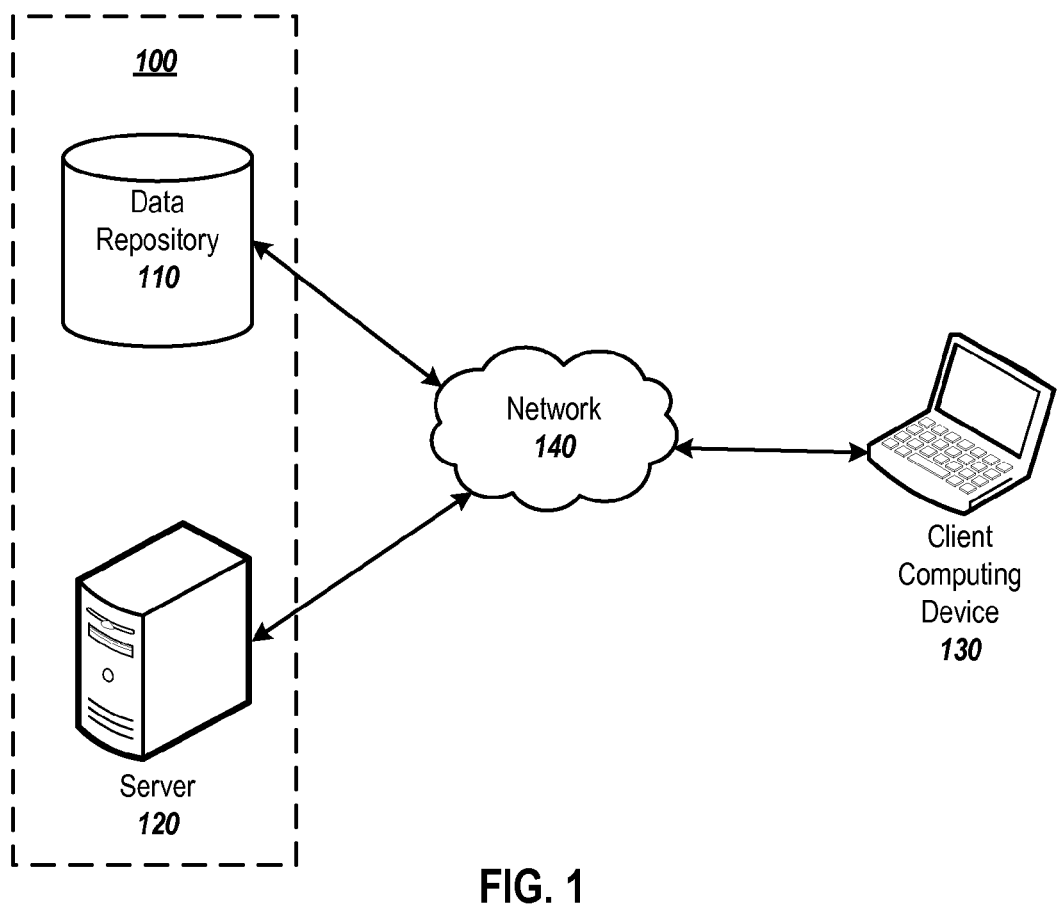
FIG. 1 illustrates an example of a system for presenting an event-related post in a stream of a social networking service.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

A new approach for informing viewing users of a social networking service about events in the social networking service may be desirable. The subject technology provides techniques for presenting information about event(s), for example, event-related post(s), in a stream of a social networking service. In some aspects, a server of the social networking service receives indicia of a plurality of event-related posts that were published in the social networking service by users of the social networking services. Each of the plurality of event-related posts is visible to a viewing user of the social networking service, as each event associated with the event-related posts is either a public event or a non-public event that was shared with the viewing user. The plurality of events associated with the event-related posts includes at least one event having a host who is not a first degree social contact of the viewing user. The server determines that a subset of the plurality of event-related posts is of interest to the user based on a set of factors. The set of factors can include factors related to participants of the event. The set of factors can include: the viewing user being invited to an event, the host of the event being a first or second degree social contact of the user, an attendee who indicated that the attendee would attend the event or an invitee of the event being a first or second degree social contact of the viewing user, or the viewing user having a predicted affinity level for the host, the attendee, or the invitee that is greater than a threshold affinity level. The set of factors can include: the event having at least an invitee threshold number of invitees or an attendee threshold number of attendees, the event having at least an endorsement threshold number of endorsements, the event having at least a comment threshold number of comments, or the event being within a threshold distance of a default geographic location (e.g., a hometown) of the user. The server receives an input for presenting a stream for the viewing user. For example, the viewing user may access the social networking service via a browser or a mobile phone application. The server presents, in response to the input, visual indicia of event-related post(s) related to the subset of the plurality of events within the stream for the viewing user. The stream includes one or more content items that do not indicate an event and are not event-related posts. The one or more content items can be text post(s), geographic check-in(s), image(s), video(s), external link(s), etc.

Some aspects of the subject technology include storing information about users of a social networking service. For example, information may be stored that a user lives or is frequently located in a certain geographic location or a predicted affinity level of a first user for a second user may be stored. A user about whom information is stored has the option of removing such information from storage at the social networking service. A user affirmatively opts-in to having information about the user stored in the social networking service or the user can opt-out of having information about the user stored in the social networking service.

As used herein, the term "event" can include, for example, an activity, celebration, outing, etc., published via a social networking service for users to learn about the event and attend the event.

As used herein, the phrase "event-related post" can include, but is not limited to, a post within a social networking service relating to an event or indicating an event to which guest(s) or participant(s) were invited via the social networking service. For example, an event-related post can include, among other things, an invitation to an event, an image, an album of images, a video, an audio file, or text uploaded to a page of an event within the social networking service, a time or geographic location change of an event within the social networking service, etc.

As used herein, the phrases, "first degree social contact," "second degree social contact," etc. can refer to degrees of separation between users in a social networking service. In some examples, a first degree social contact is a social contact of a user in the social networking service, for example, a "friend" or a member of a social circle. A second degree social contact is a social contact of a social contact of the user, e.g., a "friend of a friend." For example, if Amy is a social contact of Ben, and Ben is a social contact of Chris, but Amy is not a social contact of Chris, then Amy and Ben are first degree social contacts, Ben and Chris are first degree social contacts, and Amy and Chris are second degree social contacts. First degree social contacts are one degree of separation away from one another. Second degree social contacts are two degrees of separation away from one another. Similarly, n degree social contacts are n degrees of separation from one another.

As used herein, the term "stream," can include, for example, a feed of data (e.g., posts) by a user's social contacts that is presented to a user via a social networking service, for example, upon logging into a webpage or a mobile phone or tablet computer application of the social networking service.

FIG. 1 illustrates an example of a system 100 for presenting an event-related post in a stream of a social networking service. As shown, the system 100 includes a data repository 110 and a server 120. The data repository 110 and the server 120 communicate with one another and with and a client computing device 130 via a network 140. The network 140 may include the Internet, an intranet, a local area network, a wide area network, a wired network, a wireless network, or a virtual private network (VPN). While only one data repository 110, server 120, and client computing device 130 are illustrated, the subject technology may be implemented in conjunction with any number of data repositories 110, servers 120, or client computing devices 130. In some aspects, a single machine may implement the functions of two or more of the data repository 110, the server 120, or the client computing device 130.

The data repository 110 stores social content (e.g., posted content items, event-related post(s), or information about event(s)) associated with the social networking service. One example of the data repository 110 is described in more detail in conjunction with FIG. 2 below.

The server 120 includes one or more modules for facilitating user interaction with the social networking service via a browser or a special purpose application executing on the client computing device 130. The server 120 may be implemented as a single machine with a single processor, a multi-processor machine, or a server farm including multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display webpages, for example a webpage of the social networking service. Alternatively, the client computing device 130 may include a special-purpose application (e.g., a mobile phone or tablet computer application) for accessing the social networking service.

Figure 2:
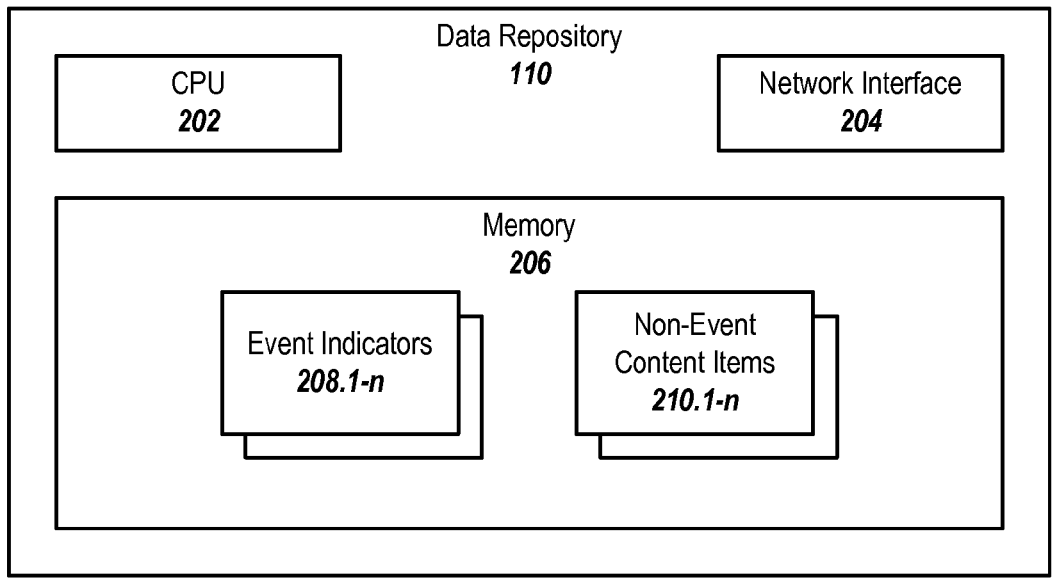
FIG. 2 illustrates an example of the data repository of FIG. 1.

FIG. 2 illustrates an example of the data repository 110 of FIG. 1. As shown, the data repository 110 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the data repository 110 to transmit and receive data in a network, e.g., network 140 of FIG. 1. The network interface 204 may include one or more network interface cards (NICs). The memory 206 stores data or instructions. The memory 206 may be one or more of a cache unit, a storage unit, an internal memory unit, or an external memory unit. As illustrated, the memory 206 includes event indicators 208.1-$n$ and non-event content items 210.1-$n$.

Each event indicator 208.$k$ stores information about an event published via the social networking service. For example, the event indicators 208.1-$n$ can include event-related posts. The information about the event can be displayed in a stream or on an event page. The event indicator 208.$k$ stores a set of users allowed to read information about the event. The event indicators 208.$k$ may correspond to a public event which any user of the social networking service can read or a subset of the users who can read information about the event can be specified by a host of the event. The subset of the users can correspond to, for example, a set of invitees or a set of first degree or second degree social contacts of the host. The event indicator 208.$k$ can include a title of the event, a geographic location of the event, a time of the event, a list of invitees to the event, or indications of how invitees responded to the invitation (e.g., RSVP yes, RSVP no, RSVP may be, or no response).

The non-event content items 210.1-$n$ can include text post(s), image(s), video(s), geographic check-in(s), or external link(s). The data repository 110 can store any number of event indicators 208.1-$n$ or non-event content items 210.1-$n$.

Figure 3:
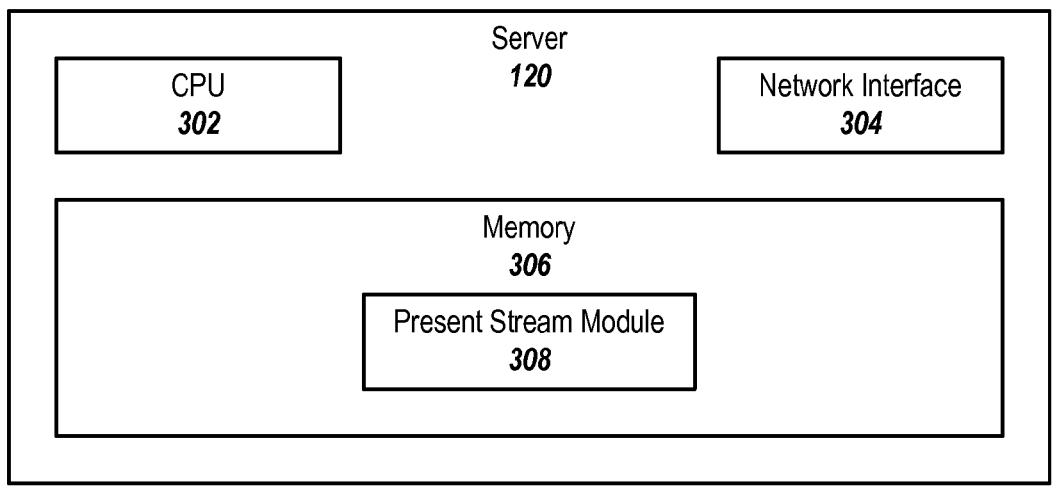
FIG. 3 illustrates an example of the server of FIG. 1.

FIG. 3 illustrates an example of the server 120 of FIG. 1. As shown, the server 120 includes a central processing unit (CPU) 302, a network interface 304, and a memory 306. The CPU 302 includes one or more processors. The CPU 302 is configured to execute computer instructions that are stored in a computer-readable medium, for example, the memory 306. The network interface 304 is configured to allow the server to transmit and receive data in a network, e.g., network 140 of FIG. 1. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes a present stream module 308.

The present stream module 308 is configured to present a stream of content items or events to a viewing user of the social networking service, for example, when the viewing user accesses the social networking service via a browser or a mobile phone or tablet computer application. In some aspects, the present stream module 308 receives indicia of a plurality of events (e.g., event indicators 208.1-$n$, which can include event-related posts). Each of the plurality of events or event-related posts is visible to the viewing user. The plurality of events includes at least one host who is not a first degree social contact of the viewing user or at least one host who is two or more degrees of separation from the viewing user. The present stream module 308 determines that a subset of the plurality of events is of interest to the viewing user based on a set of factors. The present stream module 308 presents, via a page associated with the social networking service (e.g., in the browser or in the mobile phone or tablet computer application), visual indicia of the subset of the plurality of events or event-related posts within the stream for the viewing user. The stream includes one or more content items that do not indicate an event (e.g., non-event content items 210.1-$n$). Some aspects of the operation of the present stream module are described in conjunction with FIG. 4, below.

Figure 4:
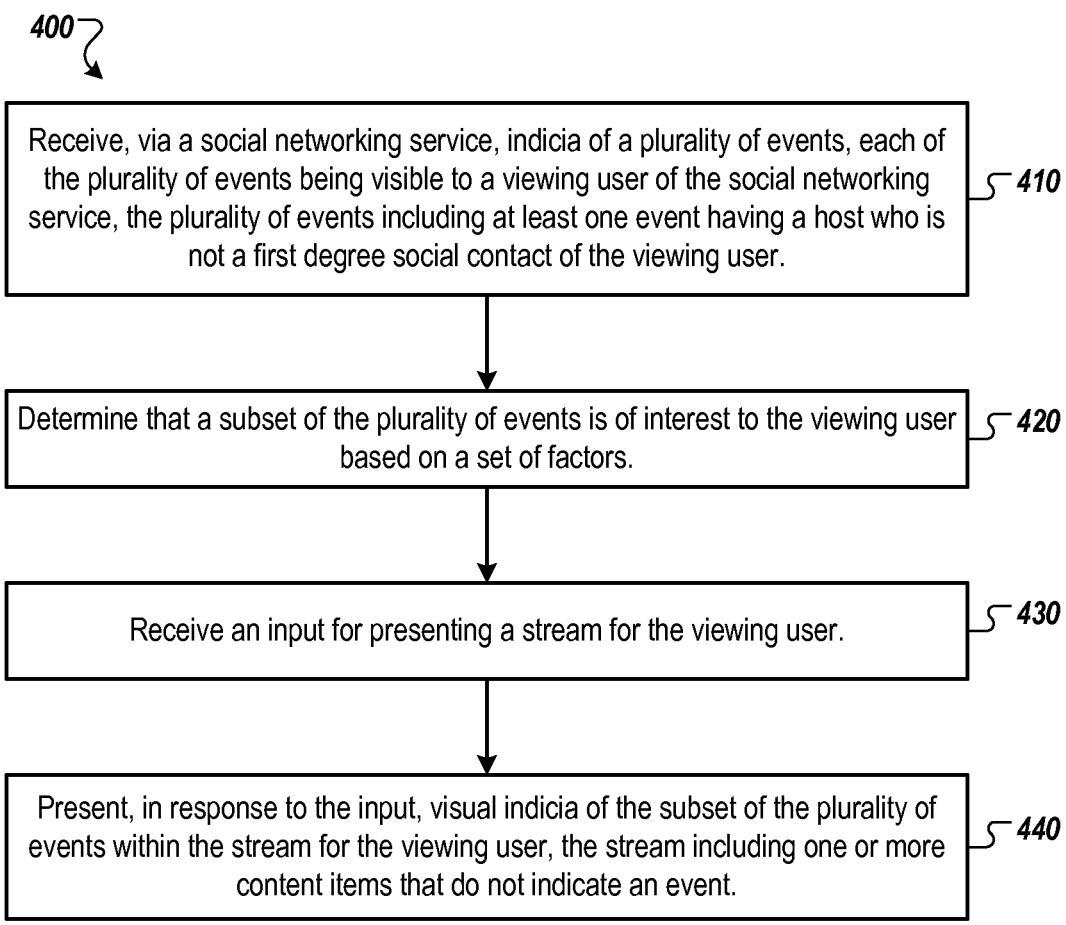
FIG. 4 illustrates an example process by which an event-related post may be presented in a stream of a social networking service.

FIG. 4 illustrates an example process 400 by which an event-related post may be presented in a stream of a social networking service.

The process 400 begins at step 410, where a server (e.g., server 120) receives, via a social networking service, indicia of a plurality of events (e.g., event indicators 208.1-$n$, which can include event-related posts). The server is associated with the social networking service. Each of the plurality of events is visible to a viewing user of the social networking service. The plurality of events include at least one event having a host who is not a first degree social contact of the viewing user or at least one event having a host who is a social contact of the viewing user.

In step 420, the server determines that a subset of the plurality of events is of interest to the viewing user based on a set of factors. The set of factors can include one or more of: the viewing user being invited to an event in the plurality of events, the host of the event being a first degree social contact of the user, the host of the event being a second degree social contact of the user, an attendee indicating a plan to attend the event or an invitee of the event being a first degree or second degree social contact of the viewing user, or the viewing user having a predicted affinity level for the host, the attendee, or the invitee exceeding an affinity threshold. The set of factors can include one or more of: the event having at least an invitee threshold (e.g., 100) number of invitees, the event having at least an attendee threshold (e.g., 75) number of attendees indicating plans to attend the event, the event having at least an endorsement threshold (e.g., 25) number of endorsements, the event having at least a comment threshold number (e.g., 20) of comments, or the event being within a threshold distance (e.g., 50 kilometers) of a default geographic location (e.g., a home location, a business location, or a location where a user typically enters geographic check-ins) of the user.

The predicted affinity level of the viewing user to another user (e.g., the host, the attendee, or the invitee) can be determined based on a number or type of interactions (e.g., electronic messages, participation in text, audio, or video chat sessions, common geographic check-ins, common attendance at events, etc.) between the viewing user and the other user. The interactions can be weighted by time. For example, the viewing user and the other user who participated in a video chat session together and geographically checked-in together at a restaurant in the last week are likely to have a higher affinity for one another than if they had engaged in these activities six months ago.

In some aspects, the server determines that the subset of the plurality of events is of interest to the viewing user by determining an interest level (e.g., expressed as a number) for the viewing user for each event from the plurality of events based on one or more of the above factors. The server defines the subset of the plurality of events to include an event threshold number of events from the plurality of events having a highest interest level for the viewing user or an interest level for the viewing user exceeding a threshold interest level value. In some examples, the event threshold number of events is determined based on a number of content items in a single loaded page of the stream (e.g., when a user scrolls down, additional page(s) of content for the stream may be loaded from the server). For example, the event threshold number may correspond to a preset percentage, e.g., 10% or 15%, of the number of content items in the single loaded page, e.g., if the single loaded page includes 20 content items, the event threshold number may be 2 or 3. As a result, the viewing user is not inundated with a large number of events when the viewing user views the stream.

In some aspects, the subset of the plurality of events includes the event(s) having a host who is not a first degree social contact of the viewing user or the event(s) having a host who is a social contact of the viewing user. In some implementations, a host of an event corresponding to at least one of the event-related posts is not a first degree social contact of the viewing user, and the set of factors includes an attendee indicating a plan to attend the event or an invitee of the event being a first degree or second degree contact of the viewing user. In some implementations, a host of an event corresponding to at least one of the event-related posts is not a first degree social contact of the viewing user, and the set of factors includes the viewing user having a predicted affinity level for the host exceeding an affinity threshold. The subset of the plurality of events can include one or more events.

In step 430, the server receives an input for presenting a stream for the viewing user. For example, the viewing user may request to view his/her stream or may access the social networking service via a browser or special purpose application executing on a client computing device (e.g., client computing device 130).

In step 440, the server presents, in response to the input, visual indicia of the subset of the plurality of events (e.g., event related post(s) associated with the subset of the plurality of events) within the stream for the viewing user. The stream includes one or more content items that do not indicate an event (e.g., non-event content items 210.1-$n$). The visual indicia of the subset of the plurality of events can include title(s) of events, geographic location(s) of events, time(s) of events, or link(s) to indicate plans to attend the event (e.g., RSVP to the event). In some aspects, the visual indication of the event is ranked in the stream adjacent to one or more content items that do not indicate an event. In some aspects, the ranking of the visual indication of the event in the stream (e.g., at the top of the stream or slightly below the top of the stream) is determined based on a time when the event was published, a time when the event will take place, and an interest level of the viewing user in the event, determined as set forth above. After step 440, the process 400 ends.

As shown, the steps 410-440 of the process 400 are carried out in series. However, in some aspects, two or more of the steps 410-440 are carried out in parallel. Also, while the process 400 illustrates the steps 410-440 being carried out in one order, the steps 410-440 may be carried out in any order.

Figure 5:
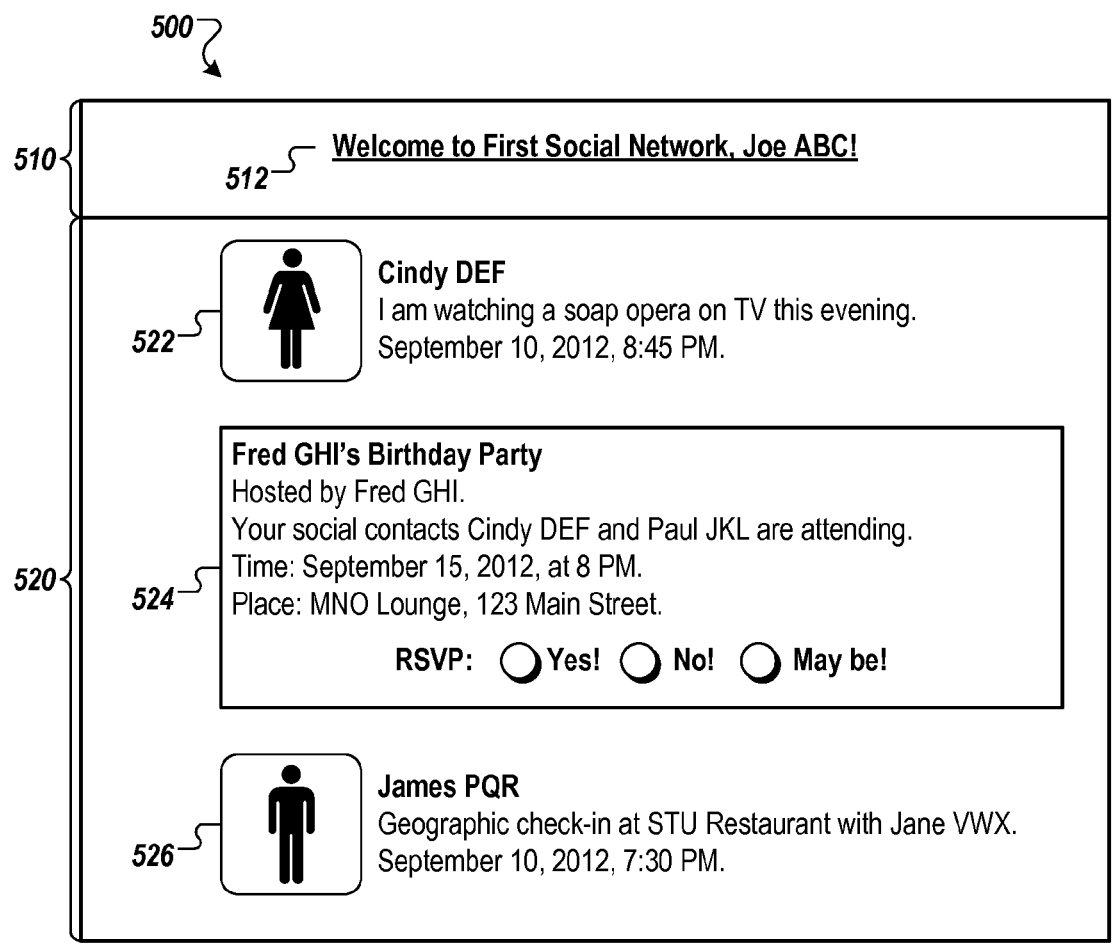
FIG. 5 illustrates an example page in a social networking service that includes an event-related post presented within a stream.

FIG. 5 illustrates an example page 500 in a social networking service that includes an event-related post presented within a stream. The page 500 can be displayed, for example, via a client computing device (e.g., client computing device 130), for example, in a browser, a mobile phone application, or a tablet computer application. As shown, the page 500 includes a header region 510 and a stream 520.

The header region 510 includes a welcome message 512, "Welcome to First Social Network, Joe ABC!" In some aspects, the header region 510 can include an identifying mark or image (e.g., a trademark or service mark) of the social networking service.

The stream 520 includes non-event content items 522 and 526 and an event-related post 524. While the stream 520 is illustrated with two non-event content items 522 and 526 and a single event-related post 524, the stream can include any number of non-event content item(s) or event related post(s). The non-event content items 522 and 526 include a text post 522 and a geographic check-in 526. In some aspects, non-event content items can also include image(s), video(s), or external link(s). As shown, the event-related post 524 indicates a title for the event, "Fred GHI's Birthday Party," a host of the event, "Fred GHI," a time, "Sep. 15, 2012, at 8 PM," and a geographic location of the event, "MNO Lounge, 123 Main Street." The event-related post 524 includes a prompt indicating why the viewing user may be interested in the event, "Your social contacts Cindy DEF and Paul JKL are attending." The event-related post 524 includes an interface (e.g., radio buttons) allowing the viewing user to indicate whether the viewing user will attend the event (RSVP yes, no, or maybe). In other example implementations, an event-related post can include information different from that set forth above, for example, an image or an album of images associated with an event. Also, as shown in FIG. 5, the event-related post 524 is ranked adjacent to the non-event content item 522 and the non-event content item 526.

Figure 6:
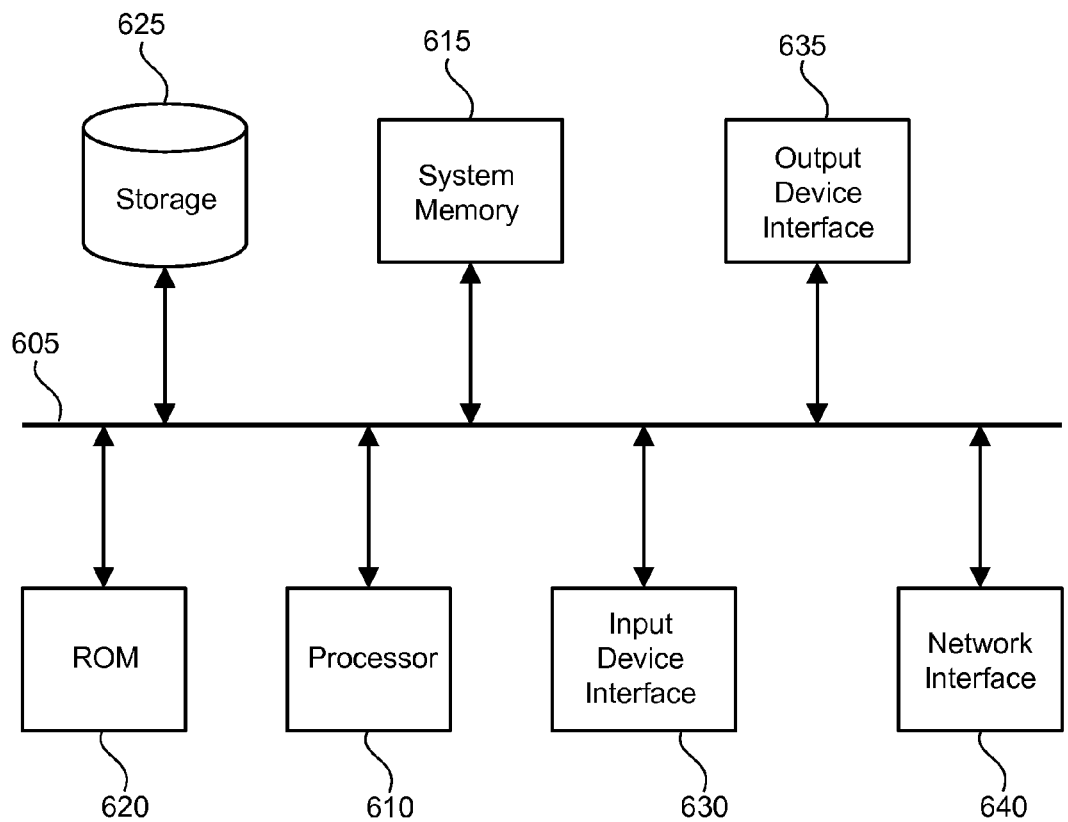
FIG. 6 conceptually illustrates an example electronic system with which some implementations of the subject technology are implemented.

FIG. 6 conceptually illustrates an electronic system 600 with which some implementations of the subject technology are implemented. For example, one or more of the data repository 110, the server 120, or the client computing device 130 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for presenting an event-related post in a stream of a social networking service in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
   receiving a plurality of event-related posts, each of the plurality of event-related posts being visible to a viewing user;
   determining that a subset of the plurality of event-related posts corresponds to an upcoming event that is of interest to the viewing user based on a set of factors, wherein a host of the upcoming event is two or more degrees of separation from the viewing user, wherein the viewing user is not invited to the upcoming event by the host, and wherein the set of factors comprises one or more factors related to an attendee indicating a plan to attend the upcoming event;
   presenting the subset of the plurality of event-related posts within a stream for the viewing user;
   generating an event invitation for the viewing user to attend the upcoming event to which the viewing user is not invited by the host; and
   presenting the generated event invitation within the stream to the viewing user.

2. The method of claim 1, wherein the set of factors comprises the attendee or another invitee being a first degree or second degree social contact of the viewing user.

3. The method of claim 1, wherein the set of factors comprises the viewing user having a predicted affinity level for the host exceeding an affinity threshold.

4. The method of claim 1, wherein the plurality of event-related posts are related to at least one event having a host who is a second degree contact of the viewing user.

5. The method of claim 1, wherein the set of factors comprises one or more of: the host of the upcoming event being a second degree contact of the viewing user, the attendee indicating the plan to attend the event or an invitee of the event being a first degree or second degree contact of the viewing user, or the viewing user having a predicted affinity level for the host, the attendee, or the invitee exceeding an affinity threshold.

6. The method of claim 1, wherein the set of factors comprises one or more of: the upcoming event having at least an invitee threshold number of invitees, the upcoming event having at least an attendee threshold number of attendees indicating plans to attend the upcoming event, the upcoming event having at least an endorsement threshold number of endorsements, the upcoming event having at least a comment threshold number of comments, or the upcoming event being within a threshold distance of a default geographic location of the viewing user.

7. The method of claim 1, wherein determining that the subset of the plurality of event-related posts corresponds to an upcoming event that is of interest to the viewing user based on the set of factors comprises:
   determining an interest level for the viewing user for each event-related post from the plurality of event-related posts; and
   defining the subset of the plurality of event-related posts to include an event threshold number of event-related posts from the plurality of event-related posts having an interest level for the viewing user exceeding a threshold interest level value.

8. The method of claim 7, wherein the event threshold number is determined based on a number of content items in a single loaded page of the stream.

9. The method of claim 1, wherein the event-related posts comprise titles of events, geographic locations of the events, times of the events, and links to indicate plans to attend the events.

10. A non-transitory computer-readable medium comprising instructions which, when executed by one or more computers, cause the one or more computers to implement a method, the method comprising:
   determining that a subset of a plurality of event-related posts corresponds to an upcoming event that is of interest to a viewing user based on a set of factors, each of the plurality of event-related posts being visible to the viewing user, wherein the plurality of event-related posts are related to a plurality of events, wherein a host of the upcoming event is two or more degrees of separation from the viewing user, wherein the viewing user is not invited to the upcoming event by the host, and wherein the set of factors comprises one or more factors related to an attendee indicating a plan to attend the upcoming event;
   presenting the subset of the plurality of event-related posts within a stream for the viewing user;
   generating an event invitation for the viewing user to attend the upcoming event to which the viewing user is not invited by the host; and presenting the generated event invitation within the stream to the viewing user.

11. The non-transitory computer-readable medium of claim 10, wherein the plurality of events comprises at least one event having a host who is a first degree social contact of the viewing user.

12. The non-transitory computer-readable medium of claim 10, wherein the set of factors comprises one or more of: the host of the upcoming event being a second degree contact of the viewing user, the attendee indicating the plan to attend the upcoming event or an invitee of the event being a first degree or second degree contact of the viewing user, or the viewing user having a predicted affinity level for the host, the attendee, or the invitee exceeding an affinity threshold.

13. The non-transitory computer-readable medium of claim 10, wherein the set of factors comprises one or more of: the upcoming event having at least an invitee threshold number of invitees, the upcoming event having at least an attendee threshold number of attendees indicating plans to attend the upcoming event, the upcoming event having at least an endorsement threshold number of endorsements, the upcoming event having at least a comment threshold number of comments, or the upcoming event being within a threshold distance of a default geographic location of the viewing user.

14. The non-transitory computer-readable medium of claim 10, wherein determining that the subset of the plurality of event-related posts corresponds to an upcoming event that is of interest to the viewing user based on the set of factors comprises:
  determining an interest level for the viewing user for each event-related post from the plurality of event-related posts; and
  defining the subset of the plurality of event-related posts to include an event threshold number of events from the plurality of event-related posts having an interest level for the viewing user exceeding a threshold interest level value.

15. The non-transitory computer-readable medium of claim 14, wherein the event threshold number is determined based on a number of content items in a single loaded page of the stream.

16. The non-transitory computer-readable medium of claim 10, wherein the event-related posts comprise titles of events, geographic locations of the events, times of the events, and links to indicate plans to attend the events.

17. A system comprising:
  one or more processors; and
  a memory comprising instructions which, when executed by the one or more processors, cause the one or more processors to implement a method, the method comprising:
  receiving a plurality of event-related posts, each of the plurality of event-related posts being visible to a viewing user, wherein the plurality of event-related posts are related to a plurality of events;
  determining that a subset of the plurality of event-related posts corresponds to an upcoming event that is of interest to the viewing user based on a set of factors, wherein a host of the upcoming event is two or more degrees of separation from the viewing user, wherein the viewing user is not invited to the upcoming event by the host, and wherein the set of factors comprises one or more factors related to an attendee indicating a plan to attend the upcoming event;
  receiving an input for presenting a stream for the viewing user;
  presenting, in response to the input, the subset of the plurality of event-related posts within the stream for the viewing user;
  generating an event invitation for the viewing user to attend the upcoming event to which the viewing user is not invited by the host; and
  presenting the generated event invitation within the stream to the viewing user.

18. The system of claim 17, wherein the plurality of events comprises at least one event having a host who is a second degree contact of the viewing user.

19. The system of claim 17, wherein the set of factors comprises one or more of: the host of the upcoming event being a second degree contact of the viewing user, the attendee indicating the plan to attend the upcoming event or an invitee of the upcoming event being a first degree or second degree contact of the viewing user, or the viewing user having a predicted affinity level for the host, the attendee, or the invitee exceeding an affinity threshold.

20. The system of claim 17, wherein the set of factors comprises one or more of: the upcoming event having at least an invitee threshold number of invitees, the upcoming event having at least an attendee threshold number of attendees indicating plans to attend the upcoming event, the upcoming event having at least an endorsement threshold number of endorsements, the upcoming event having at least a comment threshold number of comments, or the upcoming event being within a threshold distance of a default geographic location of the viewing user.

* * * * *